(12) United States Patent
Li et al.

(10) Patent No.: US 10,789,234 B2
(45) Date of Patent: Sep. 29, 2020

(54) METHOD AND APPARATUS FOR STORING DATA

(71) Applicant: EMC IP Holding Company LLC, Hopkinton, MA (US)

(72) Inventors: Sanping Li, Beijing (CN); Yu Cao, Beijing (CN); Ricky Yuxi Sun, Beijing (CN); Zhe Dong, Beijing (CN); Xiaoyan Guo, Beijing (CN); Jun Tao, Shanghai (CN); Accela Yilong Zhao, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 266 days.

(21) Appl. No.: 15/465,573

(22) Filed: Mar. 21, 2017

(65) Prior Publication Data

US 2017/0270147 A1    Sep. 21, 2017

(30) Foreign Application Priority Data

Mar. 21, 2016  (CN) .......................... 2016 1 0162002

(51) Int. Cl.
*G06F 17/30* (2006.01)
*G06F 16/22* (2019.01)
*G06F 16/23* (2019.01)
*G06F 16/182* (2019.01)

(52) U.S. Cl.
CPC ........ *G06F 16/2282* (2019.01); *G06F 16/182* (2019.01); *G06F 16/2379* (2019.01)

(58) Field of Classification Search
None
See application file for complete search history.

(56) References Cited

U.S. PATENT DOCUMENTS

| 8,131,743 | B1 | 3/2012 | Joyce et al. |
| 8,171,046 | B1 | 5/2012 | Joyce et al. |
| 8,447,782 | B1 | 5/2013 | Vipul et al. |
| 9,081,834 | B2 * | 7/2015 | Bhave ................ G06F 16/27 |
| 9,535,977 | B1 | 1/2017 | Joyce et al. |

(Continued)

FOREIGN PATENT DOCUMENTS

| CN | 101984421 | 3/2011 |
| CN | 102591593 | 7/2012 |
| CN | 103853752 | 6/2014 |

OTHER PUBLICATIONS

Cheng Huabing; "Research of Hydrological Spatial-temporal data integration method based on Web services;" Feb. 2013; Huazhong University of Science & Technology; Wuhan, China; 72 pages. Published in "Full text database of Chinese excellent master's dissertations Information technology;" Jul. 15, 2014; Issue 7; pp. I139-67.

*Primary Examiner* — Kim T Nguyen
(74) *Attorney, Agent, or Firm* — BainwoodHuang

(57) ABSTRACT

The present disclosure provides a method and apparatus for storing data. The method comprises: extracting metric information and metadata associated with the metric information from time series data, the metric information including a time value and a numerical value at the time value; and staling the metric information in an object storage device and the metadata in a database. As compared with the prior art, the present disclosure provides a flexible storage design to guarantee extensibility of storage capacity and meanwhile support fast data retrieving.

20 Claims, 7 Drawing Sheets

(56) References Cited

U.S. PATENT DOCUMENTS

| | | | |
|---|---|---|---|
| 9,743,142 B2* | 8/2017 | Cholas | H04N 5/4401 |
| 9,880,762 B1 | 1/2018 | Armangau et al. | |
| 10,146,456 B1 | 12/2018 | Gao et al. | |
| 2010/0257147 A1 | 10/2010 | De Peuter et al. | |
| 2013/0091105 A1 | 4/2013 | Bhave et al. | |
| 2015/0281018 A1* | 10/2015 | Britt | H04L 43/12 |
| | | | 707/769 |
| 2015/0324439 A1* | 11/2015 | Bhave | G06F 16/338 |
| | | | 707/607 |
| 2016/0103665 A1* | 4/2016 | Liu | G06F 11/3644 |
| | | | 717/158 |
| 2017/0064342 A1* | 3/2017 | Botsford | H04N 21/2381 |
| 2017/0085616 A1* | 3/2017 | Botsford | H04L 67/02 |
| 2017/0109678 A1* | 4/2017 | Chu | G06Q 10/06393 |
| 2018/0300621 A1* | 10/2018 | Shah | G06N 3/08 |

* cited by examiner

METHOD AND APPARATUS FOR STORING DATA

RELATED APPLICATIONS

This application claim priority from Chinese Patent Application Number CN201610162002.X, filed on Mar. 21, 2016 at the State Intellectual Piverty Office, China, titled "Method and Apparatus for Storing Data" the contents of which is herein incorporated by reference in its entirety.

FIELD

The present disclosure generally relates to storage technologies, and particularly to a method and apparatus for storing data.

BACKGROUND

Recently, time series data is getting much bigger in cloud systems and data centers. The technologies of virtualization and containerization have increased the number of independent nodes for typical distributed applications and services.

The raw time series data is usually a sequence of data points with a format like {UUID, measure, timestamp, value}, which can be directly written to a data storage device such as a database or a flat file. Despite its great flexibility, such a design stores a lot of redundant information that it is hard to query in an efficient manner. Also, analytics tasks have to suffer from terrible performance issues.

For example, in a specific, scenario where OpenStack is used as a reference cloud platform, a data point with a format like {resource-id, timestamp, value} is stored as a data item in the Ceilometer database. However, such a terrible data storage design makes the subsequent analytics process get extremely complicated, and meanwhile suffering from performance issues.

SUMMARY

In view of the above technical problems existing in the prior art, one of objectives of embodiments of the present disclosure is to provide a method and apparatus for storing data, to solve the above at least one technical problem existing in the prior art.

According to a first aspect of the present disclosure, there is provided a method of storing data. The method comprises: extracting metric information and metadata associated with the metric information from time series data, the metric information comprising a time value and a numerical value at the time value; and storing the metric information in an object storage device and the metadata in a database.

In some embodiments, the metadata may include entities and a resource, wherein the entities may include a measurement item and the resource may include a combination of the entities. In some embodiments, the time value and the numerical value may be associated with a specific entity among the entities. In some embodiments, the object storage device may include a scalable storage space.

In some embodiments, the method may further comprise: splitting a storage block of the metric information into a plurality of segments with fixed timespans. In some embodiments, the method may further comprise: storing a correspondence between the plurality segments and the timespans in the database as a part of the metadata. In some embodiments, the database may include a Structured Query Language (SQL) database.

In some embodiments, the method may further comprise: storing the metric information in the object storage device using tiering technology. In some embodiments, the object storage device may comprise a first storage device component as a performance tier and a second storage device component as a capacity tier. In some embodiments, the method may further comprise: storing the metric information in the first storage device component, and duplicating the stored metric information to the second storage device component.

In some embodiments, the method may further comprise: in response to storing the metric information in the first storage device component, deleting original object data in the first storage device component based on a policy. In some embodiments, the policy may be based on an access frequency and a storage age of the original object data.

In some embodiments, the method may further comprise: if object data to be accessed is only stored in the second storage device component, duplicating the object data from the second storage device component to the first storage device component. In some embodiments, the first storage device component may include a solid state drive (SSD) and the second storage device component may include a hard disk drive (HDD).

In some embodiments, the method may further comprise: providing a dedicated user interface for managing the metric information and the metadata. In some embodiments, the managing may include at least one of writing, reading, deleting, and updating. In some embodiments, the dedicated user interface may include a representational state transfer (REST) interface.

According to a second aspect of the present disclosure, there is provided an apparatus for storing data. The apparatus comprises: an extracting wilt configured to extract metric information and metadata associated with the metric information from time series data, the metric information including a time value and a numerical value at the time value; and a control unit configured to store the metric information in an object storage device and the metadata in a database.

According to a third aspect of the present disclosure, there is provided a computer-readable storage medium. The computer-readable storage medium has computer-readable program instructions stored thereon, and these computer-readable program instructions are used for performing the method according to the first aspect of the present disclosure.

According to a fourth aspect of the present disclosure, there is provided a storage system. The storage system comprises the apparatus according to the second aspect of the present disclosure.

As compared with approaches in the prior art, the method and apparatus for storing data according to the present disclosure provide a flexible storage design to guarantee extensibility of storage capacity, and meanwhile support fast data retrieving. This is very helpful for subsequent analysis tasks, such as time-series visualization and statistical analysis, real-time classification and prediction, even further decision making and automatic IT operations.

In addition, the method and apparatus for storing data according to one or more embodiments of the present disclosure may obtain the following technical advantages. Firstly, data requests can be quickly executed by leveraging the indexing technology in the database and fast object access in the object store. Secondly, parameter specification in the data request, for example, timespans, resource list and entity list, may support data retrieving with variant filtering and sorting, for example, variant combinations of resources and entities to satisfy user's analytics scenarios. Thirdly, the characteristics of object storage device may support almost unlimited storage capacity and flexible scalability.

BRIEF DESCRIPTION OF THE DRAWING

Through the following detailed description with reference to the accompanying drawings, the above and other objectives, features, and advantages of example embodiments of the present disclosure will become more apparent. Several example embodiments of the present disclosure will be illustrated by way of example but not limitation in the drawings in which.

DETAILED DESCRIPTION OF EMBODIMENTS

The principles and spirit of the present disclosure are described below with reference to several exemplary embodiments shown in the figures. It should be appreciated that these embodiments are only intended to enable those skilled in the art to better understand and implement the present disclosure, not to limit the scope of the present disclosure in any manner.

In a storage system, time series data does not have a general purpose and has its specific access patterns. For example, time-series data almost always arrives in time order; writes are almost always sequentially appended; time series data updates are rare; time series data deletes are in bulk, beginning at the start of historical data and proceeding in contiguous blocks, so efficient bulk deletes are important; reads on recent data have a very low latency, i.e., almost in real time; reads are typically sequential per series and reads of multiple series at once are common.

Due to the above characteristics of the time series data, the use of time series data modeling for analysis raises new challenges. This is mainly due to its huge volume, fast generation speed, requiring near unlimited storage capacity and scalability, and query flexibility.

Generally, there are two types of information in the time series data, that is, metric information and metadata. On this basis, the present disclosure provides a design or separate data storage and data models, i.e., an object storage device for time series metric information and a database for metadata, in order to support last and scalable access to the time series data.

In addition, according to the present disclosure, a tiering technology may be applied to object storage device pools to further speed up retrieving data, where solid state drives (SSDs) may be used as a performance tier and hard disk drives (HDDs) may be used as a capacity tier. Thus, the metric information may be tightly packed by series and optimized for sequential reads of a series. Meanwhile, indexing and sorting of the metadata in the database support flexible and analytics-task-oriented data grouping.

Figure 1:
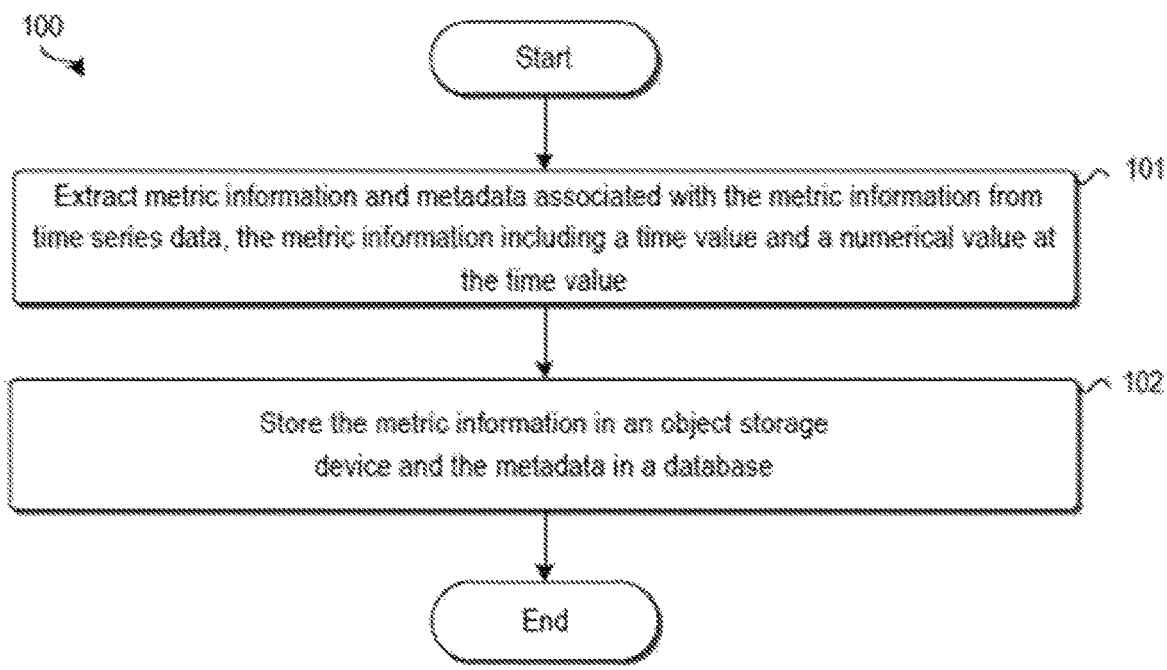
FIG. 1 schematically illustrates a flow chart of a method for storing data according to an embodiment of the present disclosure.

FIG. 1 schematically illustrates a flow chart of a method 100 for storing data according to an embodiment of the present disclosure. In some embodiments, the method 100 may be performed by an apparatus 600 described later with reference to FIG. 6.

As shown in FIG. 1, the method 100 may enter step 101 after start. In step 101, metric information and metadata associated with the metric information are extracted from time series data, wherein the metric information includes a time value and a numerical value at the time value.

As stated above, there are two types of information in the time series data, that is, the metric information and the associated metadata, wherein the metric information includes a time value and a numerical value at the time value. In some embodiments, the metric information may comprise a list of {timestamp, value} for a given entity, wherein the entity may include a measurement item, for example, temperature in a product environment, or CPU utilization of an instance, etc. In some embodiments, the time value and the numerical value may be associated with a specific entity.

According to embodiments of the present disclosure, separate data models may be used to support fast and scalable access to the time series data. That is to say, as further described later in conjunction with FIG. 2, an object storage device may be used to store the metric information and a database is used to store related metadata.

In some embodiments, the metadata may include entities and a resource, wherein the entities may include a measurement item and the resource may include a combination of the entities. In these embodiments, the time series data may be extracted into three parts, metric information, entities and resources.

In some embodiments, the resource may be linked to any number of entities according to different application scenarios. Moreover, configuration of the resource may be easy to specify flexibly in accordance with succeeding tasks such as analytics tasks.

Then, after completing step 101, the method 100 may enter step 102. In step 102, the metric information is stored in an object storage device and the metadata is stored in a database.

According to embodiments of the present disclosure, the metric information of the time series metrics may be stored in the object storage device which could provide an almost infinite space to store data with a scalable design. In some embodiments, the object storage device may have a scalable storage space.

In some embodiments, the database may include a Structured Query Language (SQL) database. As such, the information related to the resource may be stored in the SQL database, so it is possible to fully make use of its features of fast sorting and indexing.

Figure 2:
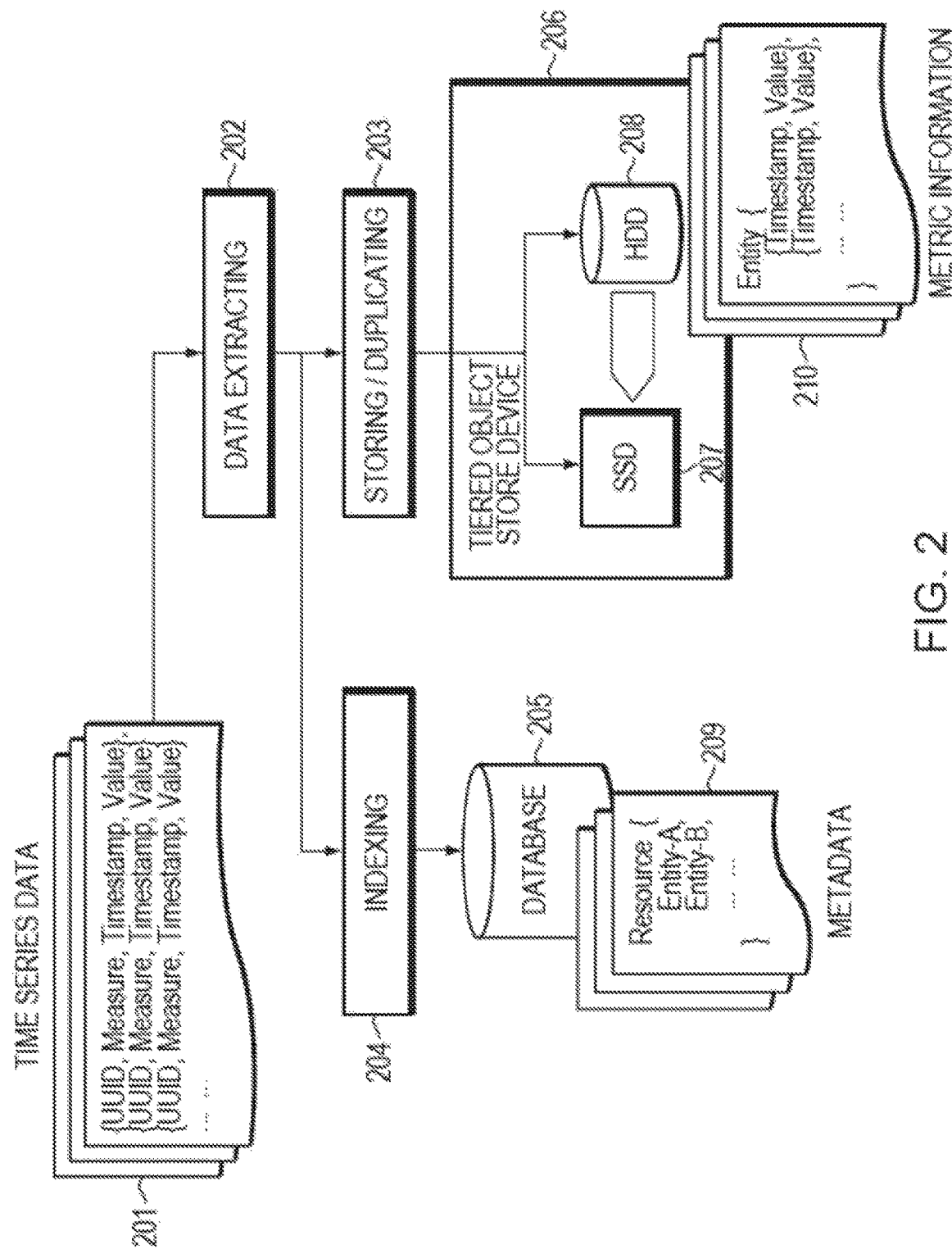
FIG. 2 schematically illustrates a diagram of a time-series data storage model using a database and a tired object storage device according to an embodiment of the present disclosure.

FIG. 2 schematically illustrates a diagram of a time-series data storage model using a database and a tired object storage device according to an embodiment of the present disclosure. It should be appreciated that the specific storage structure and procedure depicted in FIG. 2 is only a specific example of embodiments of the present disclosure. In other embodiments, the technical solution of the present disclosure may be implemented without the technical details depicted in FIG. 2.

As shown in FIG. 2, the time series data 201 in a format {UUID, measure, timestamp, value} may first undergo a process of data extracting 202. Then, the extracted metadata may undergo a process of indexing 204 and then be stored in a database 205. As shown in FIG. 2, the stored metadata may be in a form as shown by the reference number 209. That is, the metadata is stored in resources and each resource may include one or more entities.

On the other band, the extracted metric information may enter a tiered object storage device 206 after undergoing a process of storing/duplicating 203. As shown in FIG. 2 and as further described later, the object storage device 206 may include an SSD 207 as a performance tier and an HDD 208 as a capacity tier. The stored metric information may take a form of a list of a {timestamp, value} regarding a certain entity, thereby implementing separate data storage and data model and meanwhile using a tiering storage technology.

Figure 3:
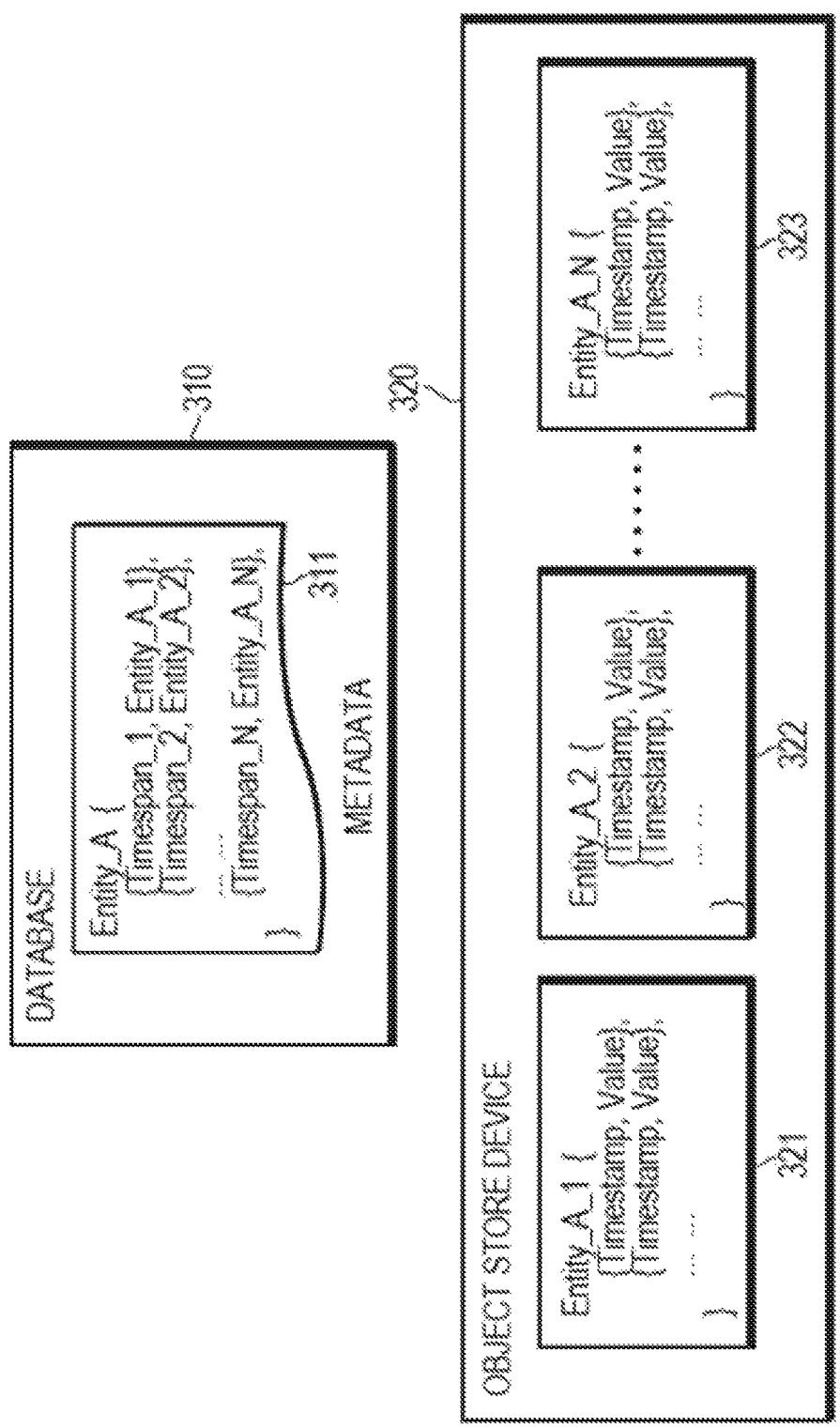
FIG. 3 schematically illustrates a diagram of entity segments with an equal timespan in the object storage device according to an embodiment of the present disclosure.

Hereinafter, further embodiments of the present disclosure are described with reference to FIG. 3. FIG. 3 schematically illustrates a diagram of entity segments with an equal timespan in the object storage device according to an embodiment of the present disclosure.

As shown in FIG. 3, taking into account the characteristics of potential infinity of the time-series data, a block of the metric information of a certain entity may be split into a plurality of segments with fixed timespans. Therefore, in some embodiments, the method 100 may further comprise splitting a storage block of the metric information into a plurality of segments with fixed timespans.

In addition, a correspondence between the entity segments and the timespans may be stored in the database as metadata, while the entity segments may be continuously written to the object storage device over time. Therefore, in some embodiments, the method 100 may further comprise storing the correspondence between the entity segments and the timespans in the database as a part of the metadata.

In a specific example depicted in FIG. 3, the database 310 may store metadata 311, and the metadata 311 may employ for example segment entities about different timespans of entity_A, such as entity_A_1, entity_A_2, . . . , entity_A_N, etc. Correspondingly, in the object storage device 320, there are stored specific metric information about entity_A_1, entity_A_2, . . . , entity_A_N, for example, {timestamp, value} list 321 of entity_A_1, {timestamp, value} list 322 of entity_A_2, . . . , {timestamp, value} list 323 of entity_A_N, etc. Therefore, a problem that the metric information size of a certain entity in the object storage device is too large can be avoided.

Hereinafter, the tiering storage technology for embodiments of the present disclosure will be described in detail. As described above, the tiering technology may be used in hybrid storage systems. For example, SSDs may provide up to 100 times more input-output operations IOPS than HDDs. Therefore, the storage systems may require the technology of auto-tiering or caching to realize the most of increased performances provided by SSDs. In some embodiments, the SSDs may be used as the performance tier and the HDDs may be used as the capacity tier.

The underlying principle of auto-tiering is that as data ages, its value declines. As data's value declines over time, it makes sense to move it to a lower-performance and lower-cost storage tier. Automated tiering is based on policies such as the data age, a frequency of access, the last time accessed and even the response time.

In addition, tiering is a reactive technology, meaning that it moves/removes data based on historical access trends or application patterns. Therefore, mission-critical data may utilize SSDs as the target storage device. As the data ages out, it may be moved out of the SSDs; when recalled, it may be copied back from HDDs.

Based on the above basic ideas, as shown in FIG. 2, the tiering technology may be applied to the object storage device 206 to further speed up retrieving data. Specifically, the SSDs 207 may be used as the performance tier, and the low-cost HDDs 208 may be used as the capacity tier. In this way, hot data objects can be very quickly retrieved from the performance tier, while data objects gradually cooled down in the SSDs 207 are deliberately self-vanished, and meanwhile there are no worries about the loss of data objects.

Therefore, in some embodiments, the method 100 may further include storing the metric information in the object storage device using the tiering technology. In these embodiments, the object storage device may include a first storage device component as the performance tier and a second storage device component as the capacity tier. In a specific embodiment of using the performance tier and the capacity tier to store the metric information, the method 100 may further include storing the metric information in the first storage device component and duplicating it to the second storage device component at the same time.

In further embodiments, the method 100 may comprise in response to storing the metric information in the first storage device component, deleting original object data in the first storage device component based on a policy. In some embodiments, the policy may be based on an access frequency and a storage age of the original object data. In addition, the method 100 may further comprise if object data to be accessed is only stored in the second storage device component, duplicating the object data from the second storage device component to the first storage device component. As stated above, the first storage device component may include a solid state drive (SSD) and the second storage device component may include a hard disk drive (HDD).

Figure 4:
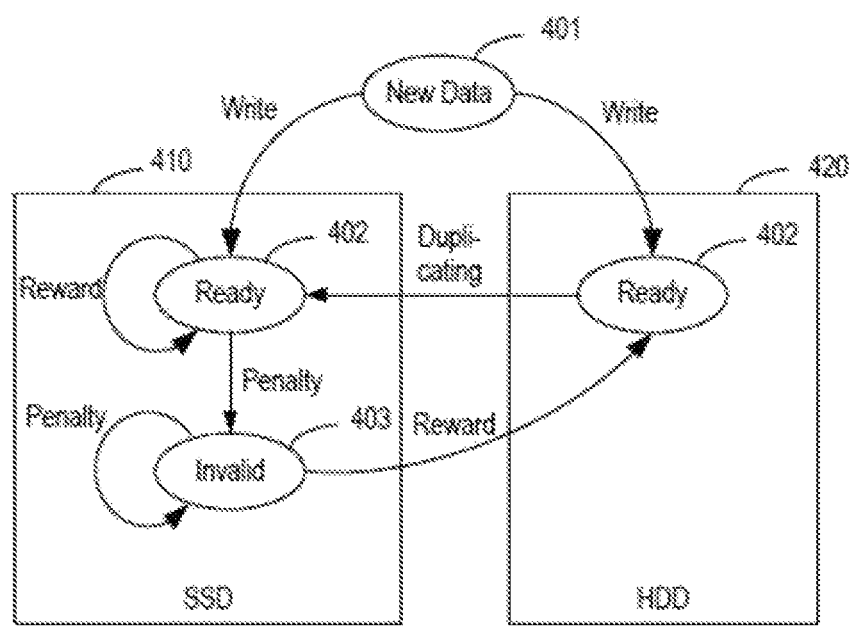
FIG. 4 schematically illustrates a diagram of state transitions of data objects according to an embodiment of the present disclosure.

FIG. 4 schematically illustrates a diagram of state transitions of data objects according to an embodiment of the present disclosure. Specifically, FIG. 4 shows data movement between the SSD and the HDD and corresponding state transitions of data objects, wherein the state transitions of data reflect changes of an access trend, "reward" indicates that there exist potential access in the near future, and "penalty" indicates that there is most likely no access in the near future.

As shown in FIG. 4, when a new data object 401 is stored in the storage device, it may be written into SSD 410, and at the same time duplicated to HDD 420. The duplicate writing of new data object 401 to both the SSD 410 and the HDD 420 enables consecutive writing and sequential organization (along the timeline) of time series data at the HDD 420, and thus facilitates the entity segmentation in Section 0 and time-range based data retrieval afterwards.

Furthermore, since newly incoming time series data is always first written to the SSD 410, this may cause some old data objects to be vanished from the SSD 410 due to the capacity constraint. The replacement policy may be based on the access frequency and time-locality of the data objects.

In addition, when receiving a request for data object, if data object has been already in the SSD 410, it would be ready for fast retrieving; such an access may be regarded as a "reward" to increase its opportunity to keep staying in the performance tier SSD 410 for next access in the very near future.

On the other hand, gradually reduced access times would result in a "penalty" for the data object to increase its opportunity to be vanished from the SSD 410.

The access to data objects only kept in the HDD 420 would bring a "reward" to increase the opportunity of warming it up, i.e., duplicating the data object from the HDD 420 to the SDD 410.

In embodiments of the present disclosure, there is also provided a dedicated user interface to implement the user's request for the time series data. In this aspect, the method 100 may further comprise providing a dedicated user interface for managing the metric information and the metadata. In some embodiments, the managing may include at least one of: writing, reading, deleting, and updating. In some embodiments, the dedicated user interface may include a representational state transfer (REST) interface.

As a non-limiting example, the representational state transfer (REST) interface is taken as an example. The dedicated user interface provided by the embodiments of the present disclosure may at least include the following RESTful API for replying to the user's request.

POST/vl/entity: create an entity.

POST/vl/entity/<ID>/measures: store a list of {timestamp: <ts>, value: <v>} to a storage device as measurements for the specified entity.

GET/vl/entity/<ID>/measures: read a list of measurements {timestamp: <ts>, value: <v>} for a specified entity. Users can specify an interval with the parameters of "start=" and "end=".

DELETE/vl/entity/<ID>: delete a specified entity, including all segments belonging to this entity.

POST/vl/resource: create a resource. Entities belonging to this resource are specified in the parameters.

PUT/vl/resource/<ID>: update entities in the resource specified.

GET/vl/resource/<ID>/measures: read measures for all entities in the specified resource.

GET/vl/resource/<ID>/entity/<ID>/measures: read measures for the specified entity in the resource.

DELETE/vl/resource/<ID>: delete a resource. However, it won't delete the entities specified in this resource.

Figure 5:
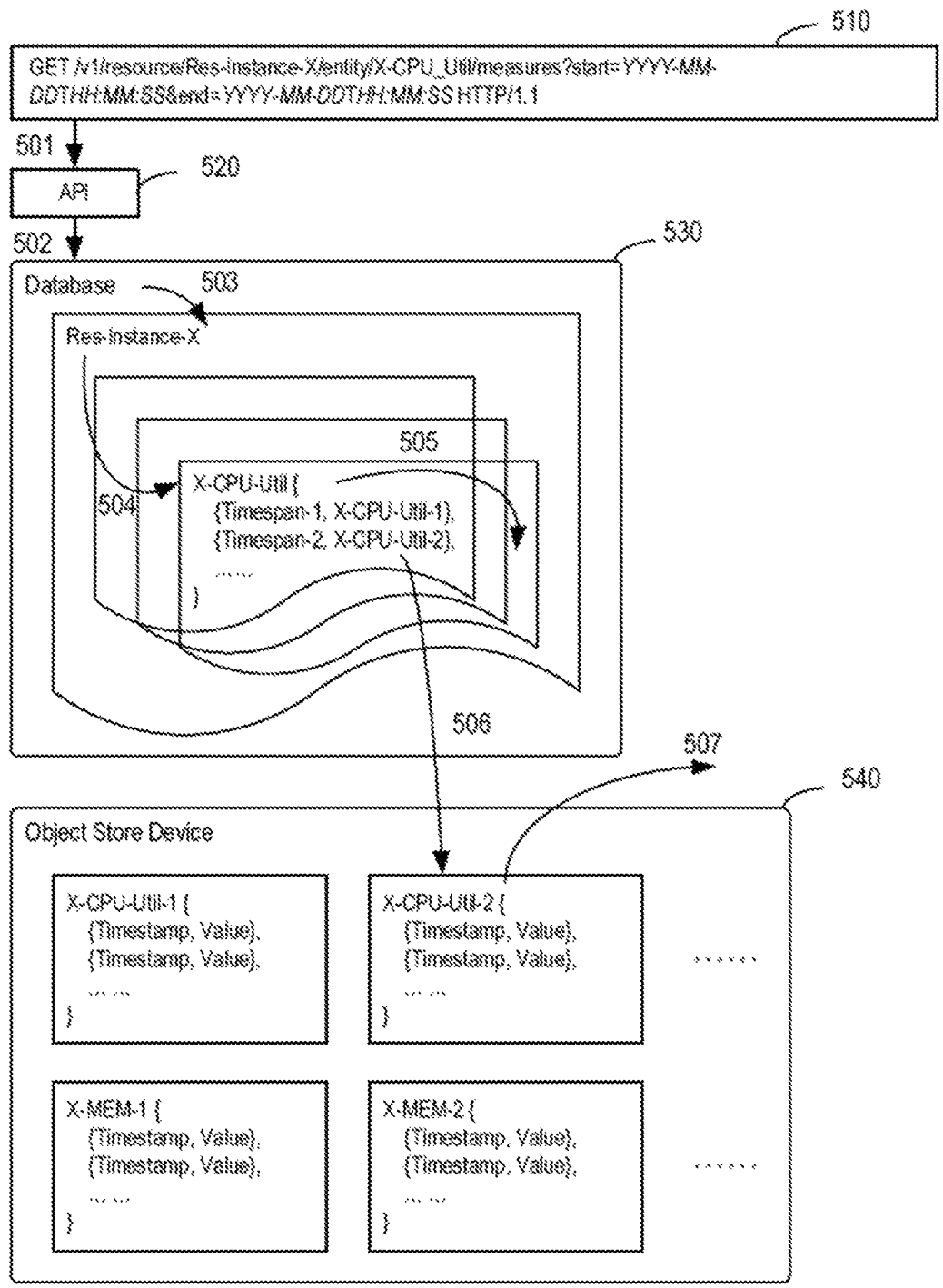
FIG. 5 schematically illustrates a diagram of a workflow of a data request according to an embodiment of the present disclosure.

Reference is made below to FIG. 5 to specifically describe a workflow of a data request according to an embodiment of the present disclosure. FIG. 5 schematically illustrates a diagram of a workflow of a data request according to an embodiment of the present disclosure.

As shown in FIG. 5, an exemplary workflow of retrieving data is depicted. In step 501, a request for retrieving REST data is received. As shown in box 510, the request is used for obtaining a CPU utilization rate data of instance X between specified timespans. In step 502, the request may be sent through an interface API 520 to a database 530 firstly to get corresponding metadata related to data objects stored in an object storage device 540. In step 503, resource information regarding the Res-instance-X is searched in the database 530. In step 504, entity information on CPU utilization (X-CPU-Util) in the resource may be searched. In step 505, with a user-specified timespan, object information regarding an entity segment is derived. In step 506, the entity segment in the object storage device 540 may be located. Finally, in step 507, a list of measurements requested may be sent to the user.

Figure 6:
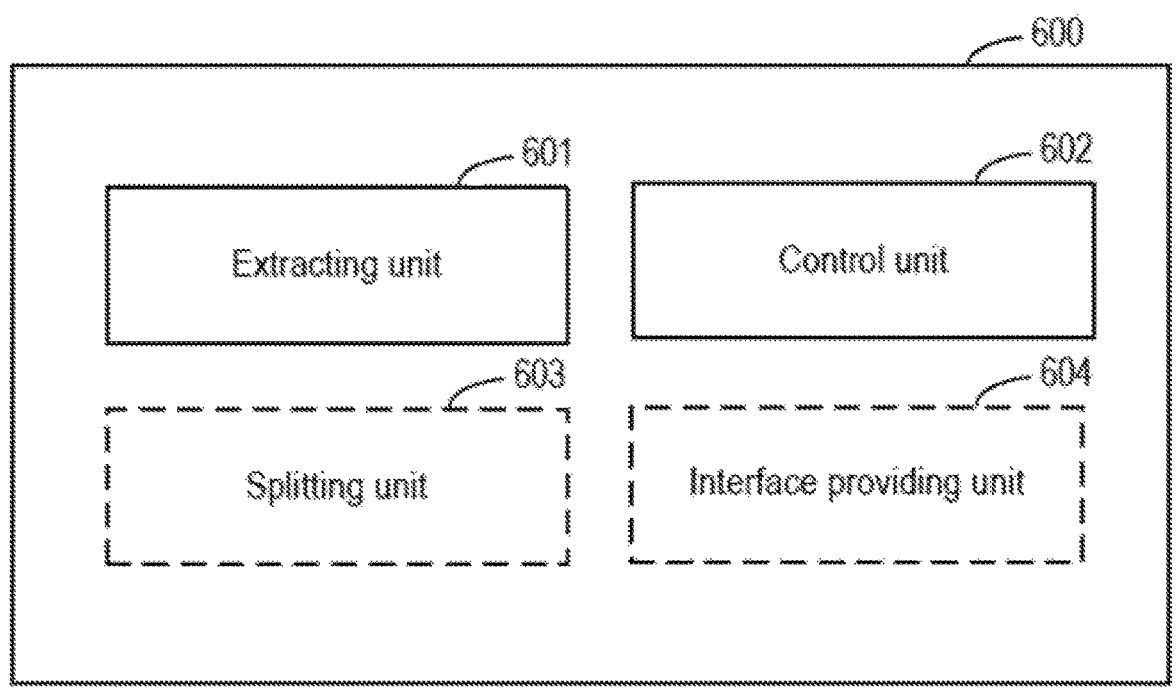
FIG. 6 schematically illustrates a block diagram of an apparatus for storing data according to an embodiment of the present disclosure.

FIG. 6 schematically illustrates a block diagram of an apparatus 600 for storing data according to an embodiment of the present disclosure. In the block diagram shown in FIG. 6, the dotted-line boxes are used to represent optional units or components. Those skilled in the art may understand that FIG. 6 only shows units or components in the apparatus 600 closely related to the present disclosure. In specific practice, the apparatus 600 may include other function units or components that enable it to operate normally. In addition, the units or components shown in FIG. 6 may have necessary connection relations, but FIG. 6 does not describe these connection relations for the sake of brevity.

As shown in FIG. 6, the apparatus 600 for storing data includes an extracting unit 601 and a control unit 602. The extracting unit 601 is configured to extract metric information and metadata associated with the metric information from time series data, wherein the metric information includes a time value and a numerical value at the time value. The control unit 602 is configured to store the metric information in an object storage device and the metadata in a database.

In some embodiments, the metadata may include entities and a resource, wherein the entities may include a measurement item and the resource may include a combination of the entities, in some embodiments, the time value and the numerical value may be associated with a specific entity, in some embodiments, the object storage device may include a scalable storage space.

In some embodiments, the apparatus 600 may further comprise a splitting unit 603 configured to split a storage block of the metric information into a plurality of segments with fixed timespans. In some embodiments, the control unit 602 may be further configured to store a correspondence between the plurality of segments and the timespans in the database as a part of the metadata. In some embodiments, the database may include a Structured Query Language (SQL) database.

In some embodiments, the control unit 602 may further be configured to store the metric information in the object storage device using a tiering technology. In some embodiments, the object storage device may include a first storage device component as a performance tier and a second storage device component as a capacity tier. In some embodiments, the control unit 602 may be further configured to store the metric information the first storage device component, and duplicate the stored metric information to the second storage device component.

In some embodiments, the control unit 602 may be further configured to, in response to storing the metric information in the first storage device component, delete original object data in the first storage device component based on a policy. In some embodiments, the policy may be based on an access frequency and a storage age of the original object data.

In some embodiments, the control unit 602 may be further configured to, if object data to be accessed is only stored in the second storage device component, duplicate the object data from the second storage device component to the first storage device component. In some embodiments, the first storage device component may include a solid state drive (SSD) and the second storage device component may include a hard disk drive (HDD).

In some embodiments, the apparatus 600 may further comprise an interface providing unit 604 configured to provide a dedicated user interface for managing the metric information and the metadata. In some embodiments, the managing may comprise at least one of: writing, reading, deleting, and updating. In some embodiments, the dedicated user interface may include a representational state transfer (REST) interface.

Figure 7:
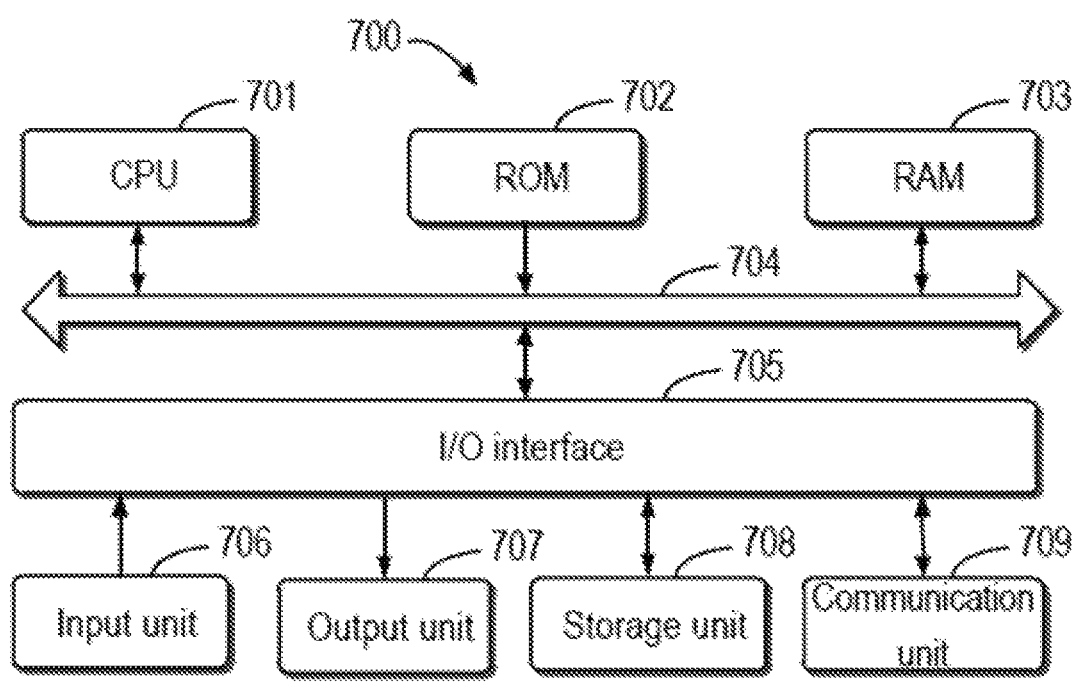
FIG. 7 schematically illustrates a block diagram of an apparatus for implementing embodiments of the present disclosure.

FIG. 7 schematically illustrates a block diagram of an apparatus 700 for implementing embodiments of the present disclosure. As shown in FIG. 7, the apparatus 700 comprises a central processing unit (CPU) 701 which is capable of performing various actions and processes in accordance with computer program instructions stored in a read only memory (ROM) 702 or computer program instructions loaded from a storage unit 708 to a random access memory (RAM) 703. In the RAM 703, various programs and data needed by operation of the apparatus 700 might be stored. The CPU 701, the ROM 702 and the RAM 703 are connected to one another via a bus 704. An input/output (I/O) interface 705 is also connected to the bus 704.

Multiple components in the apparatus 700 are connected to the 110 interface 705: an input unit 706 including a keyboard, a mouse or the like; an output unit 707 such as various displays, loudspeaker or the like; the storage unit 708 such as a magnetic disk, optical disk or the like; and a communication unit 709 such as a network card, a modem, a wireless communication transceiver, or the like. The communication unit 709 permits the apparatus 700 to exchange information/data with other devices through for example a computer network such as the Internet and/or various communication networks.

The processes and processing described above, for example, method 100, may be implemented by a processing unit 701. For example, in some embodiments, the method 100 may be implemented as a computer software program which is tangibly included in a machine-readable medium, for example the storage unit 708. In some embodiments, part or all of the computer program may be loaded and/mounted on the apparatus 700 via the ROM 702 and/or communication unit 709. When the computer program is loaded to the RAM 703 and implemented by the CPU 701, it may execute one or more steps of the method 100 described above.

In the depictions of the embodiments of the present disclosure, the term "comprise" and like wording should be understood to be open-ended, i.e., to mean "including but not limited to." The term "based on" should be understood as "at least partially based on." The term "an embodiment" or "the embodiment" should be understood as "at least one embodiment."

It should be appreciated that embodiments of the present disclosure may be implemented by hardware, software or a combination of the software and combination. The hardware part may be implemented using a dedicated logic; the software part may be stored in the memory, executed by an appropriate instruction executing system, e.g., a microprocessor or a dedicatedly designed hardware. Those ordinary skilled in art may understand that the above apparatus and method may be implemented using a computer-executable instruction and/or included in processor control code. In implementation, such code is provided on a medium such as a programmable memory, or a data carrier such as optical or electronic signal carrier.

In addition, although operations of the present methods are described in a particular order in the drawings, it does not require or imply that these operations must be performed according to this particular sequence, or a desired outcome can only be achieved by performing all shown operations. On the contrary, the execution order for the steps as depicted in the flowcharts may be varied. Additionally or alternatively, some steps may be omitted, a plurality of steps may be merged into one step, or a step may be divided into a plurality of steps for execution. It should be appreciated that features and functions of two or more devices according to the present disclosure may be embodied in one device. On the contrary, features and functions of one device as depicted above may be further divided into and embodied by a plurality of devices.

Although the present disclosure has been depicted with reference to a plurality of embodiments, it should be understood that the present disclosure is not limited to the disclosed embodiments. The present disclosure intends to cover various modifications and equivalent arrangements included in the spirit and scope of the appended claims.

We claim:

1. A method of storing data, comprising:
    extracting metric information and metadata associated with the metric information from time series data, the metric information including a time value and a numerical value at the time value;
    storing the metric information in an object storage device using a tiering technology and storing the metadata in a database, wherein the object storage device includes a first storage device component as a performance tier and a second storage device component as a capacity tier;
    receiving a data request to obtain a portion of the metric information from the object storage device;
    searching the database to access metadata pertaining to the portion of the metric information;
    locating the portion of the metric information in the object storage device based on the search in the database; and
    returning the located portion of the metric information to a user.

2. The method according to claim 1, wherein the metadata includes entities and a resource, the entities including a measurement item and the resource including a combination of the entities.

3. The method according to claim 2, wherein the time value and the numerical value are associated with a specific entity among the entities.

4. The method according to claim 1, wherein the object storage device has a scalable storage space.

5. The method according to claim 1, further comprising:
    splitting a storage block of the metric information into a plurality of segments with fixed timespans.

6. The method according to claim 5, further comprising:
    storing a correspondence between the plurality of segments and the timespans in the database as a part of the metadata.

7. The method according to claim 1, wherein the database includes a Structured Query Language (SQL) database.

8. The method according to claim 1, wherein storing the metric information in the object storage device using a tiering technology comprises:
    storing the metric information in the first storage device component; and
    duplicating the stored metric information to the second storage device component.

9. The method according to claim 8, further comprising:
    in response to storing the metric information in the first storage device component, deleting original object data in the first storage device component based on a policy.

10. The method according to claim 9, wherein the policy is based on an access frequency and a storage age of the original object data.

11. The method according to claim 9, further comprising:
if object data to be accessed is only stored in the second storage device component, duplicating the object data from the second storage device component to the first storage device component.

12. The method according to claim 1, wherein the first storage device component includes a solid state drive (SSD), and the second storage device component includes a hard disk drive (HDD).

13. The method according to claim 1, further comprising: providing a dedicated user interface for managing the metric information and the metadata.

14. The method according to claim 13, wherein the managing includes at least one of: writing, reading, deleting, and updating.

15. The method according to claim 13, wherein the dedicated user interface includes a representational state transfer (REST) interface.

16. The method according to claim 1, wherein searching the database is based on a query that specifies a timespan stored in the database, the timespan corresponding to multiple timestamped entries in the object storage device.

17. The method according to claim 1, wherein the step of storing the metric information and the metadata is performed after the step of extracting the metric information and the metadata and effects storage of the metadata separately from the metric information.

18. An apparatus for storing data, comprising:
processing circuitry coupled to memory, implementing an extraction unit and a control unit;
wherein the extracting unit is configured to extract metric information and metadata associated with the metric information from time series data, the metric information including a time value and a numerical value at the time value; and
wherein the control unit is configured to:
store the metric information in an object storage device using a tiering technology and store the metadata in a database, wherein the object storage device includes a first storage device component as a performance tier and a second storage device component as a capacity tier,
receive a data request to obtain a portion of the metric information from the object storage device,
search the database to access metadata pertaining to the portion of the metric information,
locate the portion of the metric information in the object storage device based on the search in the database, and
return the located portion of the metric information to a user.

19. The apparatus according to claim 18, wherein the metadata includes entities and a resource, the entities including a measurement item and the resource including a combination of the entities.

20. The apparatus according to claim 19, wherein the time value and the numerical value are associated with a specific entity among the entities.

* * * * *